US012760560B2

(12) United States Patent
Everett

(10) Patent No.: US 12,760,560 B2
(45) Date of Patent: Oct. 13, 2026

(54) LOCK RELEASE MECHANISM

(71) Applicant: KDB INTELLECTUAL PTY LTD, Balwyn (AU)

(72) Inventor: Timothy Riva Everett, Balwayn (AU)

(73) Assignee: KDB INTELLECTUAL PTY LTD., New South Wales (AU)

( * ) Notice: Subject to any disclaimer, the term of this patent is extended or adjusted under 35 U.S.C. 154(b) by 711 days.

(21) Appl. No.: 17/602,568

(22) PCT Filed: Apr. 14, 2020

(86) PCT No.: PCT/AU2020/000031
§ 371 (c)(1),
(2) Date: Oct. 8, 2021

(87) PCT Pub. No.: WO2020/206489
PCT Pub. Date: Oct. 15, 2020

(65) Prior Publication Data

US 2022/0178169 A1 Jun. 9, 2022

(30) Foreign Application Priority Data

Apr. 10, 2019 (AU) ................................ 2019901240
Jun. 18, 2019 (AU) ................................ 2019902122

(51) Int. Cl.
*E05B 47/00* (2006.01)
*E05B 47/06* (2006.01)
(Continued)

(52) U.S. Cl.
CPC ...... *E05B 47/0004* (2013.01); *E05B 47/0673* (2013.01); *E05B 63/0073* (2013.01);
(Continued)

(58) Field of Classification Search
CPC .... E05B 63/08; E05B 63/0073; E05B 63/143; E05B 47/02; E05B 47/06; E05B 47/0615;
(Continued)

(56) References Cited

U.S. PATENT DOCUMENTS

| | | | | |
|---|---|---|---|---|
| 6,138,485 | A | 10/2000 | Fuss et al. | |
| 6,389,855 | B2 * | 5/2002 | Renz | E05C 9/1841 70/109 |
| 2019/0390481 | A1 * | 12/2019 | Colligan | E05B 13/001 |

FOREIGN PATENT DOCUMENTS

| | | |
|---|---|---|
| AU | 2018247281 | 5/2019 |
| CA | 2326478 | 7/2007 |

(Continued)

OTHER PUBLICATIONS

Australia Intellectual Property Office, International Search Report for PCT/AU2020/000031, 29 pages Apr. 14, 2020.

*Primary Examiner* — Christine M Mills
*Assistant Examiner* — Yahya Sidky
(74) *Attorney, Agent, or Firm* — Bryan Cave Leighton Paisner LLP

(57) ABSTRACT

A lock release mechanism is disclosed. The lock release mechanism comprises a chassis adapted to receive a first lock comprising a first bolt and a second lock comprising a second bolt, the first and second lock distanced from each other, a linkage mechanism, a connector, a drive mechanism and a lever. The linkage mechanism comprises at least one arm in operative connection with at least one of the first and second lock. The connector has a first position in which the linkage mechanism is engaged and a second position in which the linkage mechanism is disengaged. The drive mechanism is operable to move the connector between the first and second positions. When the connector is in the first position, rotation of the lever causes unitary movement of the first and second bolts, and when the connector is in the (Continued)

second position, rotation of the lever causes movement of the second but not the first bolt.

23 Claims, 19 Drawing Sheets

(51) Int. Cl.

| | |
|---|---|
| ***E05B 63/00*** | (2006.01) |
| ***E05B 63/14*** | (2006.01) |
| ***E05B 65/10*** | (2006.01) |
| ***E05C 9/02*** | (2006.01) |

(52) U.S. Cl.
CPC .......... *E05B 63/143* (2013.01); *E05B 65/108* (2013.01); *E05B 65/1086* (2013.01); *E05C 9/026* (2013.01); *E05C 9/028* (2013.01); *E05B 2047/0054* (2013.01); *E05B 2047/0067* (2013.01); *E05B 2047/0086* (2013.01); *E05B 2047/0091* (2013.01)

(58) Field of Classification Search
CPC ............ E05B 47/0657; E05B 47/0004; E05B 47/0673; E05B 2047/0026; E05B 2047/0084; E05B 2047/0054; E05B 2047/0067; E05B 2047/0086; E05B 2047/0091; E05B 65/10; E05B 65/108; E05B 65/1093; E05B 65/1086; E05C 9/12; E05C 9/026; E05C 9/028; E05C 17/044; E05C 17/045; E05C 17/0462; Y10S 292/37
See application file for complete search history.

(56) References Cited

FOREIGN PATENT DOCUMENTS

| | | | | |
|---|---|---|---|---|
| DE | 3032086 | * | 3/1982 | |
| EP | 2924201 | | 9/2015 | |
| EP | 2924201 A1 | * | 9/2015 | ............ E05B 17/22 |
| FR | 3066521 | | 11/2018 | |

* cited by examiner

SECTION A - A

LOCK RELEASE MECHANISM

FIELD OF THE INVENTION

The present invention relates to a lock release mechanism for selectively releasing multiple locks on a closure. For convenience, the invention will be described in relation to security doors. However, the invention has broader application to securing a range of closures, including windows and gates.

BACKGROUND TO THE INVENTION

The reference to any prior art in this specification is not, and should not be taken as, an acknowledgement or any form of suggestion that the prior art forms part of the common general knowledge.

Security doors are specially designed to secure an area, and are often used on emergency exit routes. In some cases, security doors are also designed to resist or prevent the spread of fire. For example, security doors typically have a fire resistance rating and are used as part of a passive fire protection system to reduce the spread of fire or smoke between compartments of a building and to enable safe exit from a structure, such as a building or a ship, in the event of an emergency.

Security doors comprise a door leaf, door frame and door hardware and are required to meet local standards and certification requirements. Security doors that are also fire doors, typically include special fire door hardware such as automatic closing devices, positive latching mechanisms and smoke seals. Fire doors are typically limited to having a primary mortice lock which is self-latching.

The use of two locks on a door is common practice for various reasons including to restrict access to an area or the items within a room or building.

Under normal circumstances, unlocking one or more locks of a door rarely presents a problem. However, in the event of a fire, security risk or other hazardous event it is important that all the locks on a door be able to be quickly opened. Any delays can increase the risk of escaping the hazard, or in the case of emergency responders, increase the time taken to deal with the hazard.

Clearly, in such situations, it would be advantageous if the bolts of the locks on a door could be withdrawn from their locking position at essentially the same time by the rotation of a single handle or door knob.

In the past there have been a number of arrangements for the simultaneous unlocking of two locks by the rotation of a single handle. These include the mechanism described of U.S. Pat. No. 616,144 (dated 190 98), to open two spaced apart locks on a door constructed of wood that will warp out of line after being hung. Other mechanisms are described in U.S. Pat. No. 5,077,992, Australian Patent Application No. 2006252130, U.S. Pat. Nos. 4,109,494, 6,454,322, 3,875,772, US Publication No. US2004/0107747 A1, U.S. Pat. Nos. 3,791,180 and 5,657,653 and Australian Patent No. 2010202397.

Each of these mechanisms includes a respective rotatable member operatively associated with each lock, with an interconnection between each rotatable member, such that when both locks are locked and one rotatable member is rotated, so is the other rotatable member, and each lock is unlocked. The interconnection may be a rod or a pair of rods (for example, the mechanisms of U.S. Pat. Nos. 616,144, 5,077,992 and 6,454,322), a pulley and cable arrangement (see U.S. Pat. No. 3,875,772), or a more complex arrangement.

European Patent Publication No. 2924201, the publication of European Patent Application No. 15159962.8, to ASSA ABLOY Sicherheitstechnik GmbH, discloses self-locking lock for a closure for a panic room that has an automatic extension of a bolt 3 controlled by an auxiliary latch 5 and latch 4 all on the one door lock. An electric motor 13, triggered by a reading unit reading an identification chip, can be used to couple the bolt 3.

U.S. Pat. No. 6,138,485, to eff-eff Fritz Fuss GmbH & Co. Kommanditgesellschaft auf Aktien, is also directed to a closure for a panic room. Both a bolt 4 and a lock catch 5, on the one door lock, may be retracted by operation of an inner or panic nut 26, a panic rack 40, a cam 28, transport lever 29, side plate 12 and catch lever 30. The outer latch may also be activated under conditions of authorised access such as with an access control system.

WO2007/000763, the publication of International Patent Application No. PCT/IL2006/000746 to GOLTEK MIGON 2005 LTD., relates to a mortise lock with a panic selector. The mortise lock has a latch 74 and a plurality of face bolts 76 on the one mortise lock. Also disclosed are top and bottom auxiliary locks 84T, 84B connected with extension rods 82T, 82B. All of the latch 74, face bolts 76 and auxiliary locks 84T and 84B are opened or retracted by a mechanism within the mortise lock. A panic selector 138 may be used to permit a person at an inside of the door to unlock the latch 74, face bolts 76 and top and bottom bolts with a single depression of the inside handle 46.

German Patent Application No DE3032086, to Scovill Sicherheitseinrichtungen GmbH, discloses a panic lock that has an electromagnet to activate the panic function. Also described is a panic tube frame lock that has two lock nuts 33, 34 in the same housing one of which is operated by the panic lever 26.

There is an ongoing need for new, low cost, reliable alternatives to the mechanisms of the prior art, many of which are generally extremely complicated.

It is a preferred object of embodiments of the present invention to address or at least ameliorate one or more of the aforementioned problems of the prior art and/or provide a useful commercial alternative.

INCORPORATION BY REFERENCE

One example of a multi-lock mechanism, with a bolt withdrawal mechanism for releasing two locks, is described in the present applicant's co-pending Australian Patent Application No. 2018247281 entitled "MULTI-LOCK AND METHOD FOR USE." The entire contents of Australian Patent Application No. 2018247281 are hereby incorporated by reference into the present application.

However, it would still be desirable to provide a release mechanism for a multi-lock resulting in even less delay in unlocking a door in an emergency situation.

SUMMARY OF THE INVENTION

Generally, embodiments of the invention relate to a lock release mechanism. In a particular embodiment, the lock release mechanism is for selectively releasing multiple locks on a closure.

In one form, although it need not be the only or indeed the broadest form, the invention resides in a lock release mechanism comprising:

a chassis adapted to receive a first lock comprising a first bolt and a second lock comprising a second bolt,
a linkage mechanism comprising at least one arm in operative connection with at least one of the first lock and the second lock,
a connector comprising a first position in which the linkage mechanism is engaged and a second position in which the linkage mechanism is disengaged,
a drive mechanism to move the connector between the first position and the second position, and
an actuator,
wherein when the connector is in the first position, operation of the actuator causes unitary movement of the first bolt and the second bolt, and when the connector is in the second position, operation of the actuator causes movement of the second bolt but not the first bolt.

In one embodiment, the lock release mechanism may further comprise a first arm in operative connection with the first bolt and a second arm in operative connection with the second bolt.

In another embodiment, the first position of the connector may comprise the first arm and the second arm being engaged and the second position of the connector may comprise the first arm and the second arm being disengaged.

The lock release mechanism may be installed on a door or other closure.

The connector may, for example, comprise one or more pin and/or one or more shaft. In some embodiments, the pin may comprise a floating ball lock pin, optionally, captive in a slotted lever. In other embodiments, the pin may comprise an engaging pin. Thus, when the floating ball lock pin is in the first position both locks may be manually operated by the actuator. Activation of the actuator, such as, rotation of the lever or handle or depressing of the lever, simultaneously disengages the lock bolts from a strike that is attached to the frame, thus releasing the door.

In different embodiments, the drive mechanism may comprise an automated drive mechanism such as, various electrically operated drive mechanisms. For example, the drive mechanism may comprise a motor, to drive movement of the connector between the first and second position. The motor may, for example, rotate a gear, and the gear may be engaged with a toothed rack attached or connected to the connector. However, other drive mechanisms may be used, such as electronic or electromechanical mechanisms, including a solenoid, a sprung pin activated by a solenoid, or other motor driven cam arrangements. The electronic or electromechanical mechanisms may draw power from a power supply.

The drive mechanism may be internally located.

The solenoid may actuate the connector between a first, extended position and a second, retracted position. When the connector is extended, the linkage mechanism may be engaged so that the two locks may be operated at the same time. When the shaft is in the retracted position, the linkage mechanism may be disengaged so that the two locks operate independently.

The connector may further comprise a commissioning control. The commissioning control may comprise a locking tab which may be moved between an inactive position and a commissioned position. In the inactive position, the locking tab may extend in the direction of a flange, so that locking tab engages with the surface of the flange, such that the shaft is prevented from adopting the extended position. To move to the commissioned position, a fastener may be unfastened, and the locking tab rotated so that it does not engage with the flange.

The drive mechanism may be disposed inside the chassis. The device mechanism may be disposed within the linkage mechanism. The drive mechanism may act directly on the actuator.

The drive mechanism may be controlled electronically by an electronic control. The electronic control may comprise one or more of a circuit board or computer such as, a programmable logic controller. The electronic control may be disposed inside or external to the chassis. The drive mechanism may be connected or connectable to a main door or building access controller.

The drive mechanism may be actuated when a particular event is detected. For example, the drive mechanism may be actuated when a person activates an emergency feature of a building—such as a "break glass" switch.

The drive mechanism may operate in a vertical or a horizontal direction.

The actuator may comprise a lever or handle. The lever or handle may rotate or be pushed. The lever may comprise a lever handle, or in some embodiments a door knob.

The connector may also be manually operable, in addition to being operated by the drive mechanism. In one embodiment, the connector may comprise an engaging pin that is manually operated by a push and/or pull button. The push and/or pull button may act as a lever on the engaging pin, moving it between the first position and the second position.

Preferably, one lock—the upper lock—is a deadbolt lock and the other is a latch lock such as, a mortise lock. Typically, each lock comprises a separate lock body including a keyway for insertion of a key in the lock and a face plate. The first lock may be comprised in a deadbolt lock body and the second lock comprised in a mortise lock body. The deadbolt lock body and the mortise lock body may be disposed in the chassis at a distance from each other. The position of one or both the deadbolt lock body and the mortise lock body may be adjustable within the chassis. The position of the deadbolt lock body and the position of the mortise lock body in the chassis may be adjustable independently of each other.

Each lock used in association with the lock release mechanism typically may comprise a lock body and a faceplate. The chassis may be elongate, and may support each of the lock bodies. The chassis may also comprise a first aperture for receiving the first lock and a second aperture for receiving the second lock. Typically, the faceplate of each lock seats neatly into the chassis aperture and is flush with the external surface of the chassis. In addition, to allow the adjustability described below, typically comprised are a first floating plate sandwiched between the first faceplate of the first lock and the chassis, and a second floating plate between the second faceplate of the second lock and the chassis.

The first lock and/or second lock may comprise an actuation sensor. When the first lock comprises a deadbolt lock, the deadbolt lock may comprise an actuation sensor to detect actuation or turning of the deadbolt lock mechanism. The actuation sensor may detect rotation of a rotatable disk or turn snib. The sensor may comprise a limit switch.

According to any one of the above forms or aspects, a monitoring sensor to detect removal of the chassis or actuator may be further comprised. The monitoring sensor may comprise a button which compresses when the actuator is installed on the door. The monitoring sensor will decompress or expand when the chassis or actuator is removed and activate to alert that the lock body has been tampered with.

In another form of embodiments described herein, there is provided a method of mounting the lock release mechanism of the present invention to a closure, the method comprising the steps of:

- inserting the first lock in a first recess within the chassis,
- inserting the second lock in a second recess within the chassis,
- affixing the first lock and the second lock to the chassis, and
- attaching the chassis to the closure.

The closure may comprise a door panel.

In a further aspect of the invention, there is provided a closure comprising a lock release mechanism according to the first aspect of the invention installed therein.

Further aspects of the present invention will also be described in the detailed description of the invention below.

A detailed description of one or more embodiments of the invention is provided below, along with accompanying figures that illustrate by way of example the principles of the invention. While the invention is described in connection with such embodiments, it should be understood that the invention is not limited to any one or combination of embodiments. On the contrary, the scope of the invention is limited only by the appended claims and the invention encompasses numerous alternatives, modifications and equivalents.

For the purpose of example, numerous specific details are set forth in the following description in order to provide a thorough understanding of the present invention. The present invention may be practiced according to the claims without some or all of these specific details. For the purposes of clarity, technical material that is known in the technical fields related to the invention has not been described in detail so that the present invention is not unnecessarily obscured.

In particular, locking features usable in embodiments of the present invention are described in detail in Australian Patent Application No. 2018247281, which has already been incorporated by reference into this specification. Accordingly, the below description of embodiments of the invention focuses on features specific to the drive mechanism and other improvements to the lock(s) described in Australian Patent Application No. 20182047281. Other locking features described in Australian Patent Application No 2018247281 will be described at a high level and to provide context where appropriate. However, for full details of those other locking features, the applicant relies on the incorporation by reference of the full specification of Australian Patent Application No. 2018247281.

BRIEF DESCRIPTION OF THE DRAWINGS

In order that the invention may be readily understood and put into practical effect, reference will now be made to embodiments of the present invention with reference to the accompanying drawings, wherein like reference numbers refer to identical elements. The drawings are provided by way of example only, wherein:

FIG. 14A shows a rear perspective view with some components removed.

Figure 1:
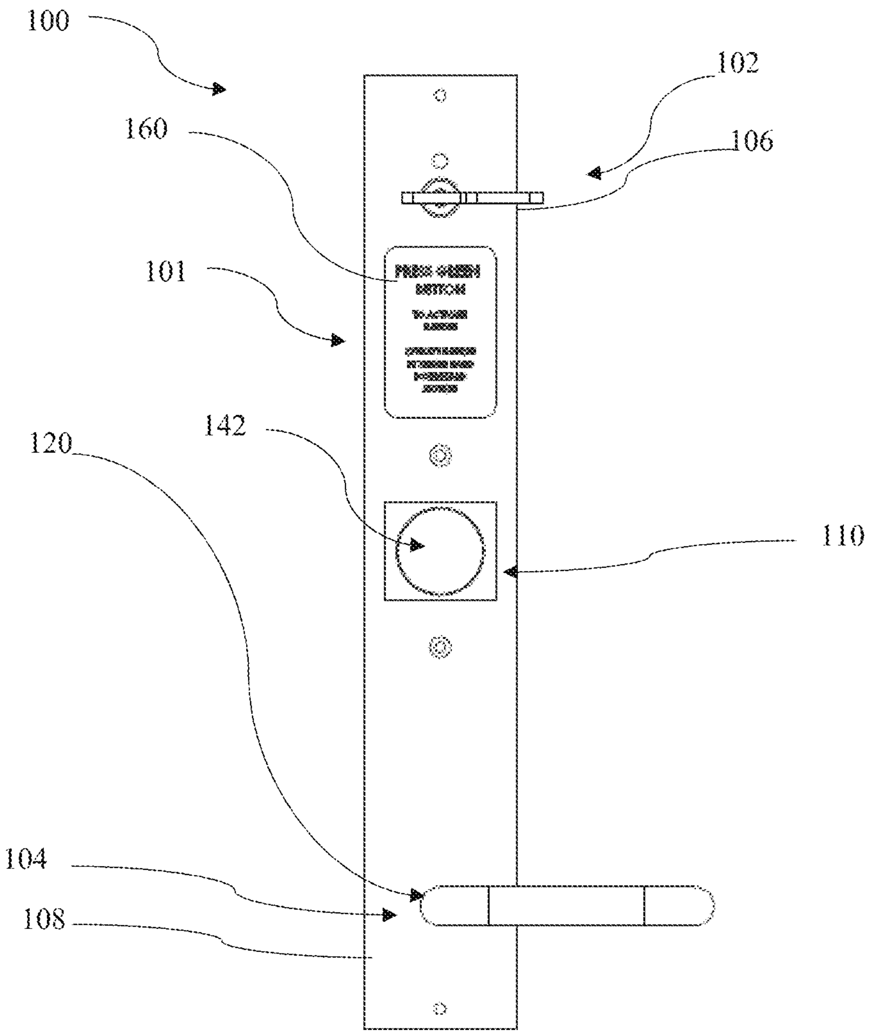
FIG. 1 is a front view of a locking arrangement for a door, according to an embodiment of the present invention.

Skilled addressees will appreciate that elements in the drawings are illustrated for simplicity and clarity and have not necessarily been drawn to scale. For example, the relative dimensions of some elements in the drawings may be distorted to help improve understanding of embodiments of the present invention.

DETAILED DESCRIPTION OF THE INVENTION

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Figure 2:
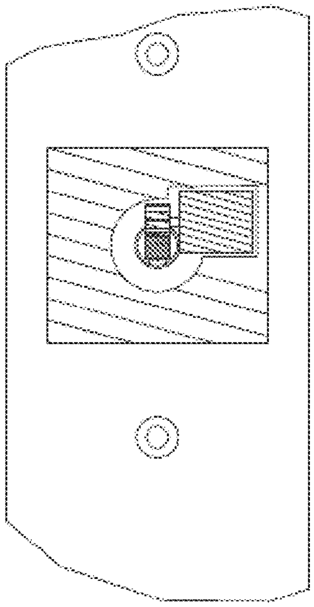
FIG. 2 is a partial cross section of the locking arrangement of FIG. 1 showing the drive mechanism.

Typical deadbolt locks and mortise locks are depicted for example in the discussion of prior art deadbolt and mortise locks in Australian Patent Application No. 2018247281 incorporated above (FIGS. 1 and 2 of that application). A typical deadbolt lock comprises a body and faceplate from which a bolt may protrude, the bolt being engaged by turning a knob or a key in a keyway (in contrast to lock bolts or latches that operate based on a spring action). A typical mortise lock comprises a mortise lock body, a keyway, a faceplate and a latch, and can be opened from the inside by turning a lever or knob but can only be opened from the outside with a key in the keyway. A mortise lock may include a non-locking sprung latch operated by a door handle.

Doors normally require at least one lock so that the door can be secured in the closed position. Many doors have two locks a latch lock (such as a mortise lock) and a deadbolt lock for security which are typically located adjacent the closing edge of the door. Fire and/or security doors are usually configured so that both locks can be simply and quickly manually operated by a handle, simultaneously unlocking both locks. As the handle is moved, a latch hook or bolt disengages with a strike that is attached to the frame, thus releasing the door. A strike is a plate attached to a door frame with one or more holes for removably receiving a latch or bolt from a lock.

FIG. 1 is a front view of a lock release mechanism 100 according to one embodiment of the invention. Although lock release mechanism 100 will be described with reference to locking arrangement 101, it may be implemented with other locking arrangements. According to an embodiment of the present invention, locking arrangement 101 is adapted to include a first lock 102, in the form of a deadbolt lock, and a second lock 104, in the form of a mortise lock. These locks 102, 104 are mounted together to form multi-lock locking arrangement 101 substantially as described in Australian Patent Application No. 2018247281.

A Table of Parts is provided in Table 1 below.

The locking arrangement 101 has two functions—a primary latching function and a deadbolt function. The locking arrangement 101 includes an actuator 120, which in the embodiment of FIG. 1 is a lever, in the form of a handle, on the front of the chassis 110; in some embodiments, handles may be provided on both sides of a door 300 (not shown). The handle is mounted on chassis 110, which is adapted to receive two locks bodies, first lock body 106 and second lock body 108, illustrated in the form of a deadbolt lock body and a mortise lock body, respectively. As will be appreciated from, for example, FIG. 3 of Australian Patent Application No. 2018247281, each lock 102, 104 comprises a respective bolt 116 (not shown) and latch 118 (not shown), and a strike plate 400 (not shown) is mounted on a door frame or door jamb 500 and has recesses for removably receiving the bolt 116 and latch 118.

In other embodiments, actuator 120 may take the form of a lever. Such a lever or handle may be rotated or be pushed to be actuated.

The lock bodies 106, 108 are spaced apart and at either end of a linkage mechanism 180 carried on chassis 110, substantially as described in Australian Patent Application No. 2018247281. The chassis 110 also includes pre-drilled mount holes for mounting in a closure such as door 300 and is affixed using screws or other convenient fixing means. Regular rectangular cut outs are made in the door 300 to accept chassis 110, making mounting straightforward.

Figure 8:
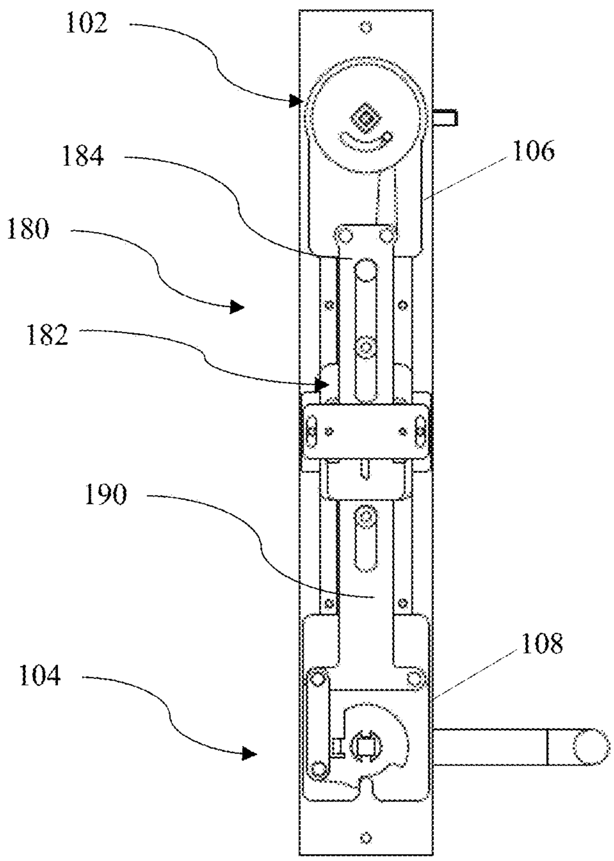
FIG. 8 is a rear view of the locking arrangement of FIG. 6 (unmounted).

As shown in the embodiment of FIG. 8, linkage mechanism 180 comprises a first linkage arm 184 in operative connection with first lock 102 and a second linkage arm 190 in operative connection with second lock 104. As will be readily appreciated by the skilled person, Australian Patent Application No. 2018247281 refers to a "first linkage arm 17" which is associated with the lower lock, the first lock, which is a mortise lock, and a "second linkage arm 18" which is associated with the upper lock, the second lock, which is a deadbolt lock. While the names of the first linkage arm 182 and second linkage arm 190 are switched, with respect to the names used in Australian Patent Application No. 2018247281, their interaction may be the same.

The first lock 102 comprising the deadbolt lock body 106 and the second lock 104 comprising the mortise lock body 108 are shown to be disposed in the chassis 110 at a distance from each other. The position of one or both the deadbolt lock body 106 and the mortise lock body 108 is adjustable within the chassis. The position of the deadbolt lock body 106 and the position of the mortise lock body 108 may be adjustable independently.

Figure 3:
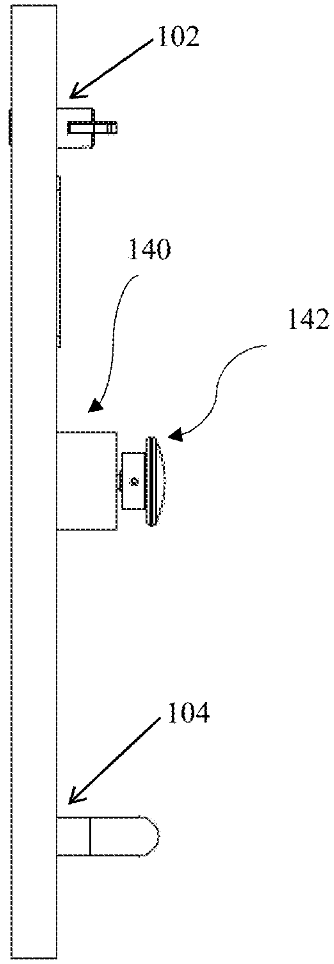
FIG. 3 is a side view of the lock of FIG. 1.

According to one embodiment of the invention, as shown in FIGS. 1 and 3, there is provided a button 142 which can be manually pushed or pulled to operate a connector 150. The push and/or pull button 142 can move connector 150 comprising a floating ball lock pin 152 between a first position in which the first linkage arm 184 and second linkage arm 190 are engaged at linkage 182 and a second position in which the first linkage arm 184 and second linkage arm 190 are disengaged. The push and/or pull button 142 is located on the outer surface of the chassis 110 and in the interior of a room and allows a user to select independent lever operation of one lock, second lock 104, or unitary lever operation of both locks 104, 106.

For example, when the multi-lock locking arrangement 101 of the invention is used on an emergency exit, a user can push the button 142 (engaging both locks) and operate the lower mortise lock 104 to open door 300. Thus, the user may operate door 300 and both locks 104, 106 simultaneously with single handed operation.

Figure 4:
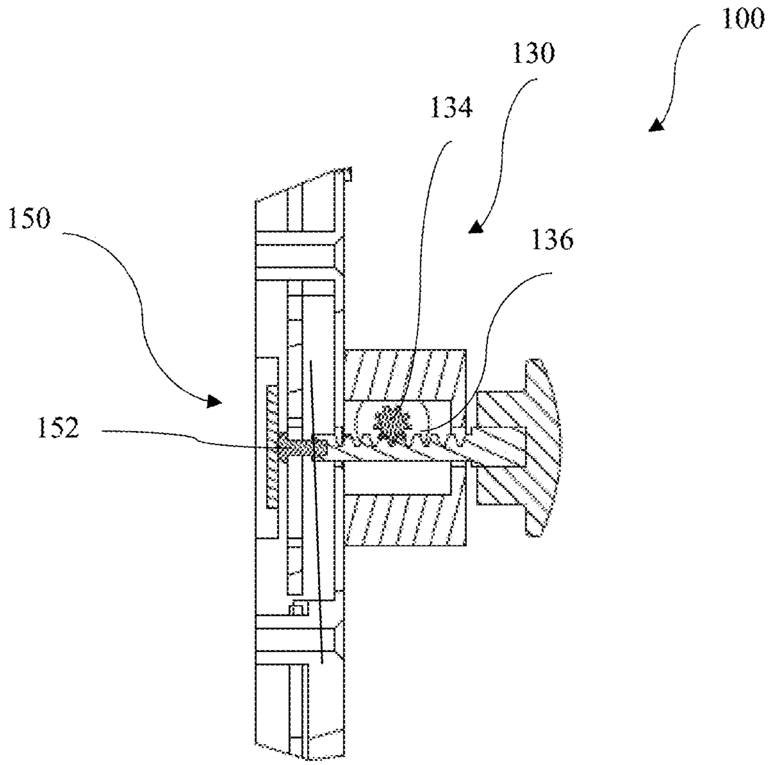
FIG. 4 is a partial cross section of the lock of FIG. 3, showing the drive mechanism and the connector in a first position.
Figure 5:
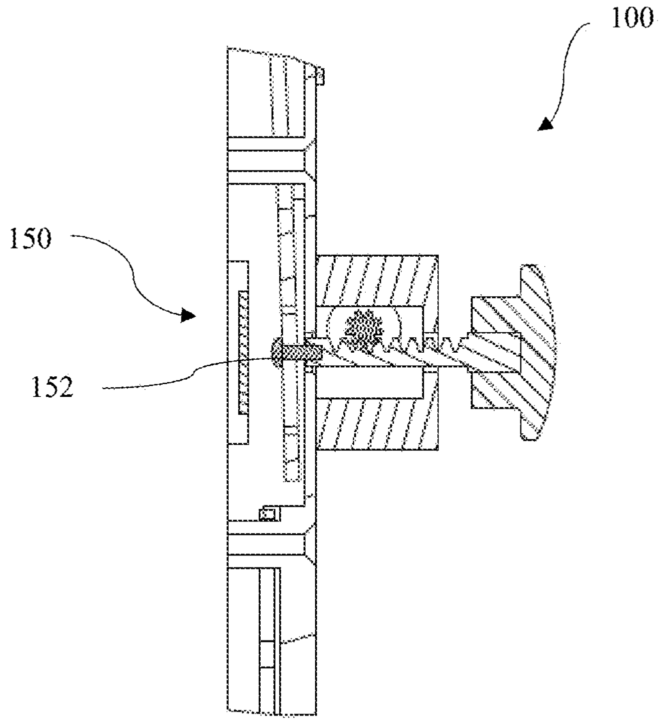
FIG. 5 is a partial cross section of the lock of FIG. 3, showing the drive mechanism and the connector in a second position.
Figure 6:
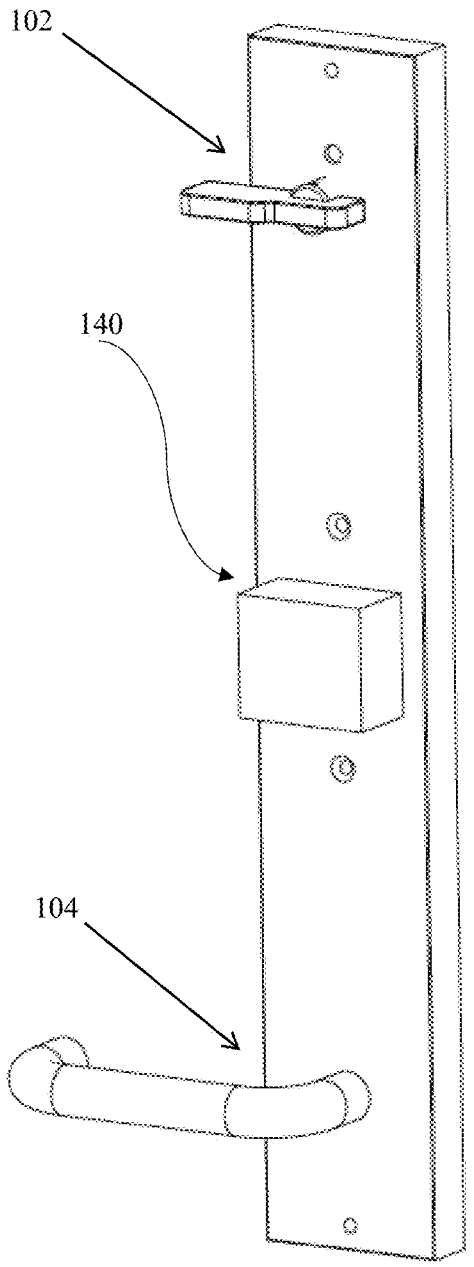
FIG. 6 is a front perspective view of a locking arrangement for a door, according to a second embodiment of the present invention.
Figure 7:
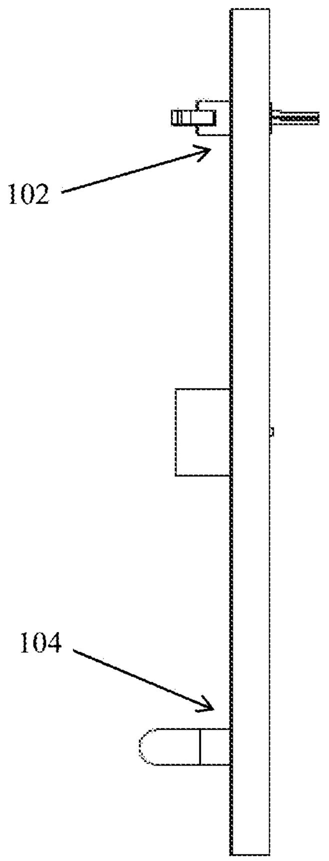
FIG. 7 is a side view of the locking arrangement of FIG. 6.

FIGS. 4 and 5 depict the linkage mechanism 180 of the locking arrangement 101 of FIGS. 1, 2 and 3 in greater detail. FIG. 4 shows button 142 pushed or depressed so that the handle 120 operates both locks 102, 104 simultaneously as it is operated in a conventional fashion. FIG. 5 shows button 142 pulled out, or not pushed in, so that the handle 120 operates only second lock 104.

Also shown in FIGS. 4 and 5 is drive mechanism 130, which forms part of the lock release mechanism 100, and which moves connector 150 between the first position and the second position. In the embodiment shown, drive mechanism 130 comprises a motor 132 (see FIG. 13) to drive movement of the connector 150 between the first and second position. Motor 132 rotates gear 134, and gear 134 may be engaged with a toothed rack 136 attached or connected to pin 152.

The invention may comprise various electrically or electromechanically operated drive mechanisms 130 for connector 150. In other embodiments, solenoid 138 (not shown), a sprung pin 139 (not shown) activated by a solenoid 138, or other motor driven cam arrangements may be utilised to operate connector 150.

Figure 14A:
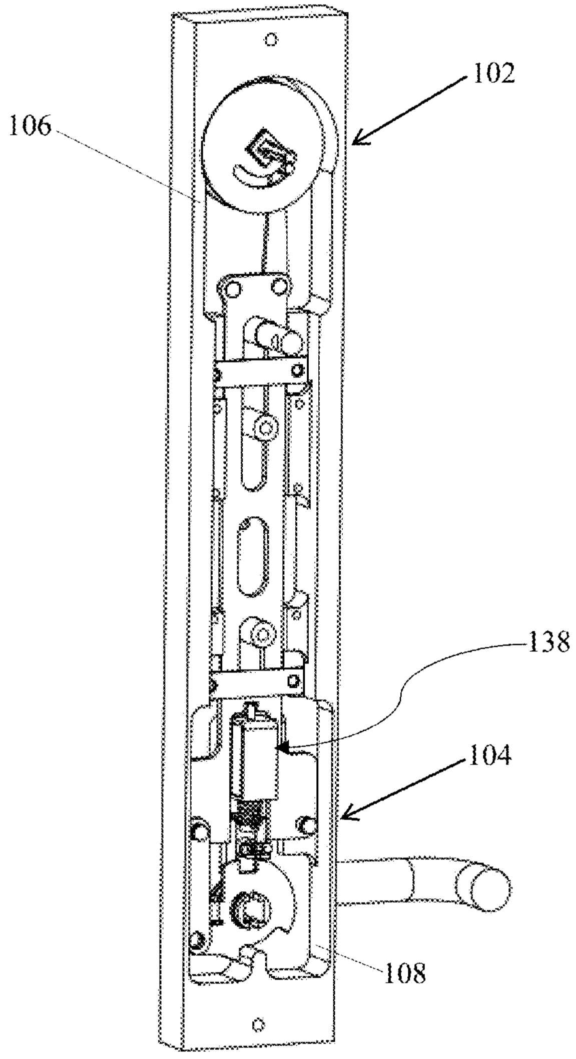
FIGS. 14A; 14B; 14C; 14D and 14E show various views of an embodiment comprising a solenoid according to one embodiment of the invention.

FIGS. 14A; 14B; 14C; 14D and 14E show another embodiment of drive mechanism 130 in the form of a solenoid 138. FIG. 14A shows a rear perspective view with some components removed to more easily observe the operation of the solenoid 138.

Figure 14B:
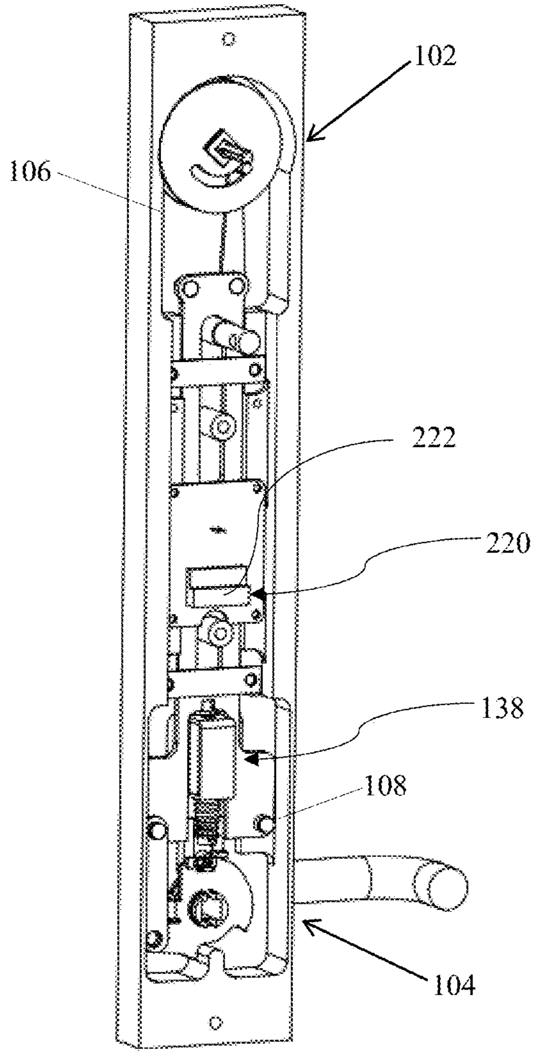
FIG. 14B shows a rear perspective view.
Figure 14C:
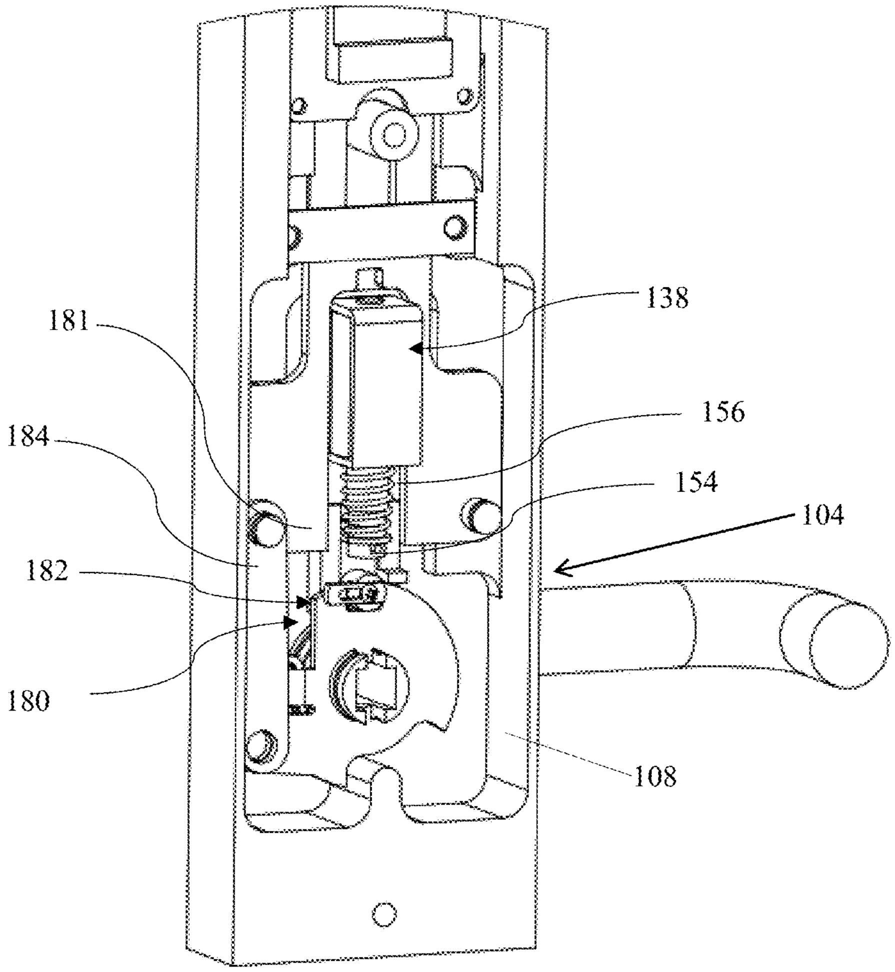
FIG. 14C shows a close up, rear perspective view of a locking arrangement in a normal state with no power and engaged.

The solenoid 138 actuates a shaft 154 between a first, extended position shown in close up view in FIG. 14B and a second, retracted position shown in close up view in FIG. 14C. As shown in FIG. 14B, when shaft 154 is extended, the linkage mechanism 180 is engaged at linkage 184 so that the two locks 102, 104 may be operated at the same time. When the shaft 154 is in the retracted position, the linkage mechanism 180 is disengaged so that the two locks 102, 104 operate independently.

As shown in FIG. 14C, when shaft 156 is retracted, the linkage mechanism 180 is disengaged so there is no linkage.

Figure 14D:
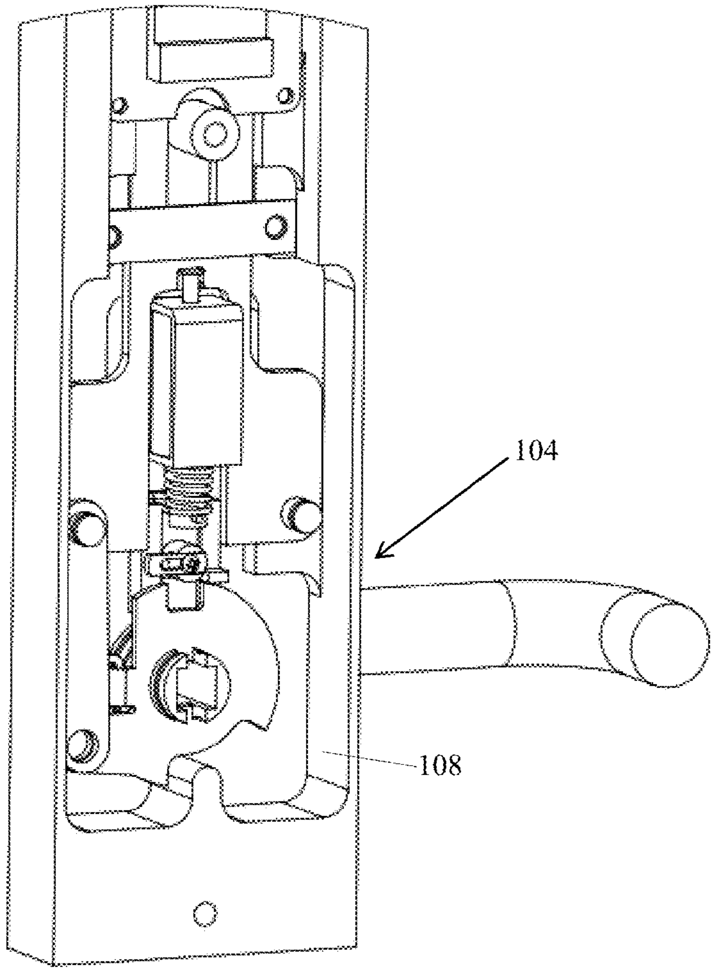
FIG. 14D shows a close up, rear perspective view in a power on, disengaged state.
Figure 14E:
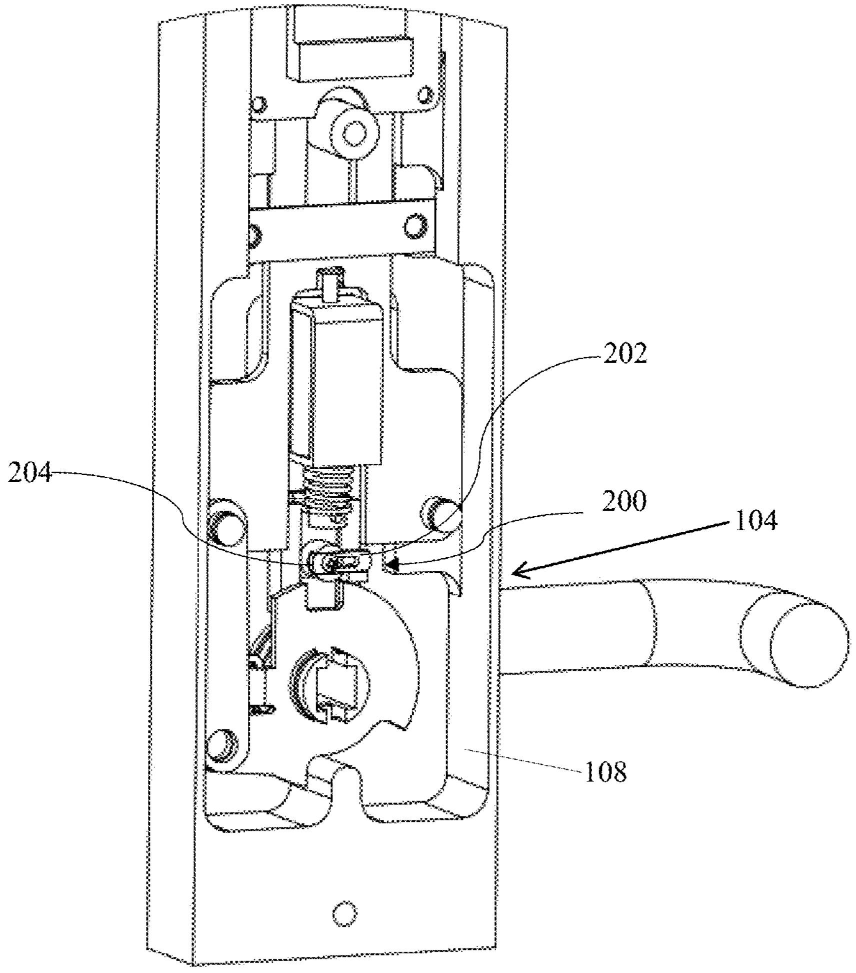
FIG. 14E shows a close up, rear perspective view in a power not connected, disengaged state.

FIGS. 14DC, 14D and 14E show a commissioning control 200 according to one embodiment of the invention. The commissioning control 200 comprises a locking tab 202 which can be moved between an inactive position and a commissioned position. In the inactive position shown in FIG. 14D, locking tab 202 extends in the direction of a flange 181, so that locking tab 202 engages with the surface of the flange 181, such that shaft 154 is prevented from adopting the extended position. To move to the commissioned position, a fastener 204 is unfastened, and locking tab 202 is rotated so that it does not engage with flange 181. The commissioned state is also shown in FIG. 14C.

Advantageously, the commissioning control 200 allows the door 300 to be installed and opened before the building has been powered up or commissioned. This is of significant advantage because in some cases a door 300 may be installed weeks or even months before all power connections are available and the door 300 fully operational.

Solenoid 138 is one example of a drive mechanism 130 disposed inside chassis 110. As shown in the embodiment of FIGS. 14A; 14B; 14C; and 14D, the solenoid 138 is also an example of a drive mechanism 130 disposed within the linkage mechanism 180 so that solenoid 138 may act directly on the actuator or handle 120.

The drive mechanism 130 may be controlled electronically by an electronic control 220. FIG. 14B shows one embodiment of an electronic control 220 in the form of a printed circuit board 222. From the teaching herein, a skilled person is readily able to select other suitable electronic controls such as, a programmable logic controller or other type of computer. In the embodiment shown in FIG. 14B, electronic control 220 is disposed inside the chassis 110. In other embodiments, the electronic control 220 may be eternal to the chassis 110 or door. Advantageously, drive mechanism 220 may be connected or connectable to a main door or building access controller.

Figure 13:
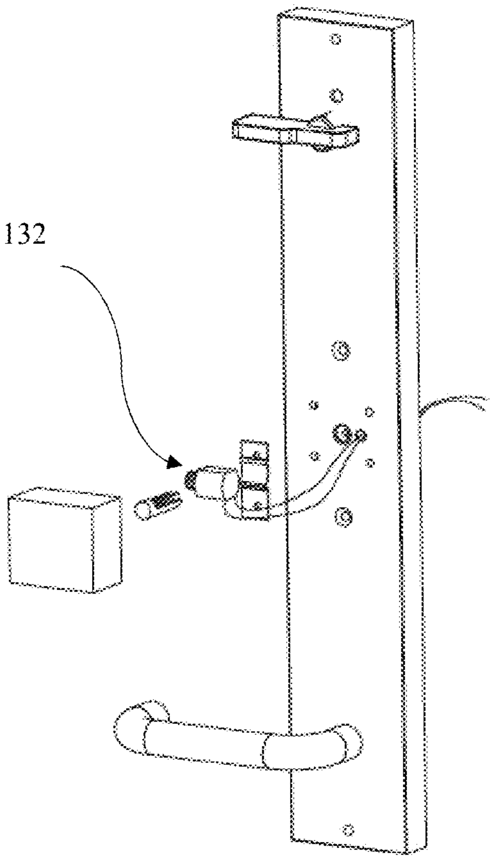
FIG. 13 is a partially exploded view showing the wires to connect the locking arrangement to a power supply.

As shown in FIG. 13, the electronic or electromechanical mechanisms, such as motor 132 and/or solenoid 138 may draw power from a power supply to which it is connected. When not powered the button 142 can still be operated manually.

FIGS. 6 to 13 show another embodiment, of a lock release mechanism 100 according to the invention in which button 142 is absent. In the embodiment of FIGS. 6 to 13, lock release mechanism 100, and thereby motor 132, is activated by a standard manual alarm activation such as, a break glass switch positioned adjacent to a door 300. While the manual push button 142 is absent, a drive mechanism housing 140 still houses the motor 132 and rack 136 to be operated when the break glass switch is activated. The housing 140, with or without button 142, may be fitted to a door 300 in which locks 102, 104 are already installed.

The lock release mechanism 100 may comprise an advisory sign 160 comprising instructions on use.

Advantageously, drive mechanism 130 may be actuated when a particular event is detected. For example, drive mechanism 130 may be actuated when a person activates an emergency feature of a building such as a break glass switch, which may be situated near door 300 comprising lock release mechanism 100 mounted thereon. Tying the operation of the drive mechanism 130 to emergency features of the door 300 and/or building means that in an emergency situation, the door 300 can advantageously be operated solely using handle 120.

Figure 9:
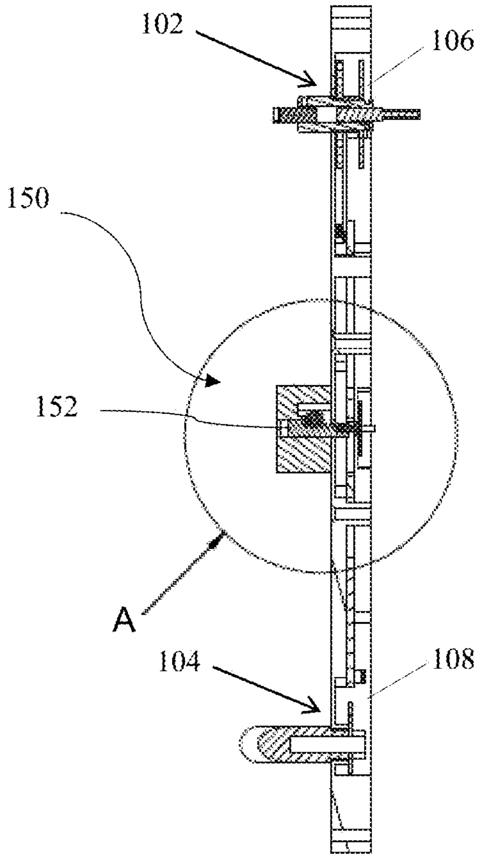
FIG. 9 is a cross sectional view of the locking arrangement of FIG. 6.
Figure 11:
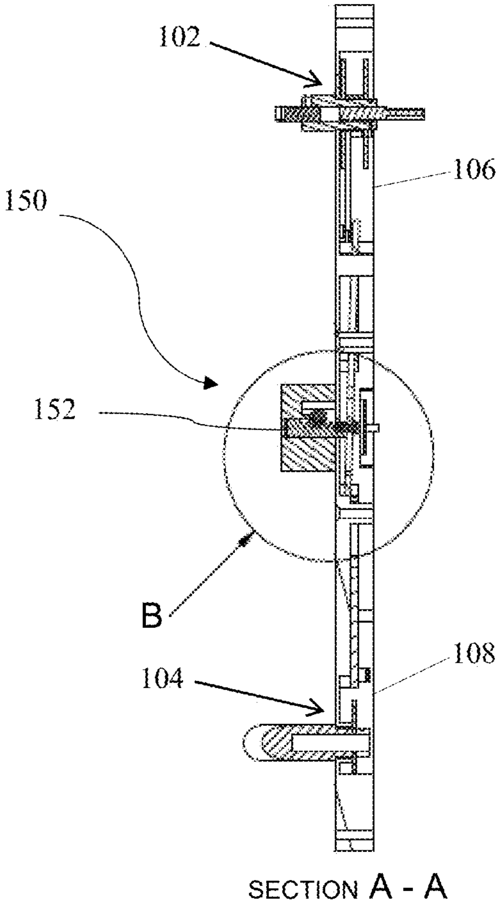
FIG. 11 is a cross sectional view of the locking arrangement of FIG. 6.

FIG. 9 is a cross-sectional view showing in detail the first position of the pin 152. In this first position, the first linkage arm 184 and second linkage arm 190 are engaged and move as a single unit so that the two locks 102, 104 may be operated at the same time. FIG. 11 depicts the second position of pin 152, when the first arm 184 and the second arm 190 of the linkage mechanism 180 are disengaged and operate independently so that each of the two locks 102, 104 may be separately operated.

Figure 10:
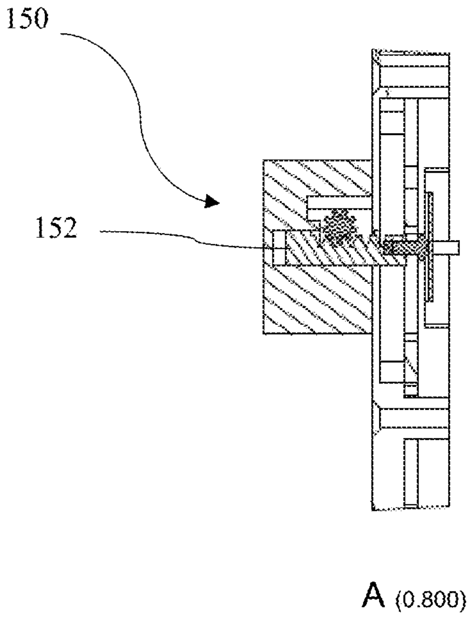
FIG. 10 is a close up view of the area circled and labelled "A" in FIG. 9.
Figure 12:
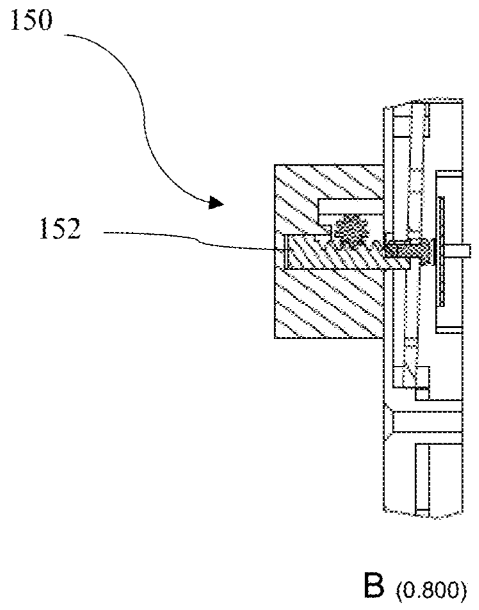
FIG. 12 is a close up view of the area circled and labelled "B" in FIG. 11.

FIGS. 10 and 12 are close up views of the areas circled and labelled "A" and "B" in FIGS. 9 and 11, respectively.

Figure 15:
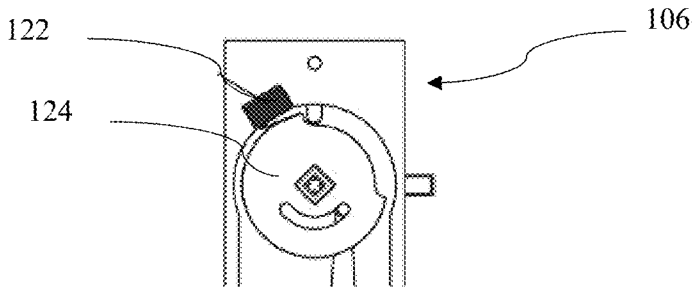
FIG. 15 is a schematic diagram showing an actuation sensor according to one embodiment of the invention.

As shown in FIG. 15, when in the form of a deadbolt lock, first lock body 106, may further comprise an actuation sensor 122 to detect actuation or turning of the lock mechanism. The actuation sensor 122 may detect rotation of a rotatable disk or turn snib 124. The sensor 122 may comprise a limit switch. From the teaching herein a skilled person is readily able to select other suitable actuation sensors 122 for one or both of the first lock body 106 and the second lock body 108.

Figure 16:
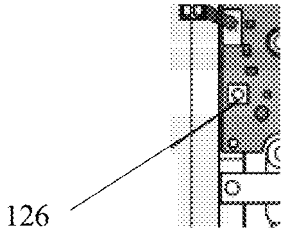
FIG. 16 is schematic diagram showing a monitoring sensor to detect tampering according to one embodiment of the invention.

FIG. 16 shown a monitoring sensor 126 to detect removal of chassis 110 or actuator 120. In the embodiment show, monitoring sensor 126 is a button which compresses when the chassis 110 is installed on door 300. Should the chassis 110 or actuator 120 be removed, the button will decompress or expand to activate monitoring sensor 126, alerting that the chassis 110 or actuator 120 has been tampered with.

Advantageously, chassis 110 may be retrofitted to existing doors 300 because the cut-out required in the door panel will encompass the previously existing (now unnecessary) openings.

One of the advantages of the invention is that it does not need to include a device designed to defeat 'under the door' attacks. 'Under the door' attacks consist of simply passing a special tool, typically configured from wire, under the door and grabbing the handle from the inside. Such an attack cannot succeed when the floating ball lock pin 152 is disengaged because the locks operate independently. The wire would only operate the lower mortise lock 104.

The components of the lock release mechanism 100 may all be formed from steel, although different materials may be used for different applications. The components may be formed as castings or mouldings, extrusions, and/or may be machined to take their final shape for installation.

In this specification, the terms "comprises", "comprising" or similar terms are intended to mean a non-exclusive inclusion, such that an apparatus that comprises a list of elements does not include those elements solely, but may well include other elements not listed.

Throughout the specification the aim has been to describe the invention without limiting the invention to any one embodiment or specific collection of features. Persons skilled in the relevant art may realize variations from the specific embodiments that will nonetheless fall within the scope of the invention.

TABLE

| Table 1: Table of Parts | |
|---|---|
| 100 | lock release mechanism |
| 101 | locking arrangement |
| 102 | first lock |
| 104 | second lock |
| 106 | first lock body |
| 108 | second lock body |
| 110 | chassis |
| 116 | bolt (not shown) |
| 118 | latch (not shown) |
| 120 | actuator |
| 122 | actuation sensor |
| 124 | rotatable disk or turn snib |
| 126 | monitoring sensor |
| 130 | drive mechanism |
| 132 | motor |
| 134 | gear |
| 136 | rack |
| 138 | solenoid (not shown) |
| 139 | sprung pin (not shown) |
| 140 | drive mechanism housing |
| 141 | push button base plate |
| 142 | push/pull button |
| 143 | angled cut profile pin |
| 144 | spring |
| 145 | cam |
| 146 | locating screws |
| 148 | fixing screws |
| 150 | connector |
| 152 | engaging pin |
| 154 | shaft |
| 156 | spring |
| 160 | advisory sign |
| 180 | linkage mechanism |
| 181 | flange |
| 182 | linkage |
| 184 | first linkage arm |
| 186 | guide slot in first linkage arm |
| 190 | second linkage arm |
| 192 | guide slot in second linkage arm |
| 194 | extension to second linkage arm |
| 196 | secondary guide pin |
| 200 | commissioning control |
| 202 | locking tab |
| 204 | fastener |
| 220 | electronic control |
| 222 | circuit board |
| 300 | door (not shown) |
| 302 | door panel (not shown) |
| 400 | strike plate (not shown) |
| 500 | door frame jamb (not shown) |

What is claimed is:

1. A lock for a closure, the lock comprising:

a chassis adapted to receive a first lock comprising a first faceplate and a first bolt and a second lock comprising a second faceplate and a second bolt wherein the first lock is in a first lock body received in a first recess in the chassis and the second lock is in a second lock body received in a second recess in the chassis, wherein the first lock body and the second lock body are disposed in the chassis at a distance from each other and are adjustable within the chassis independently of each other;

a linkage mechanism comprising a first arm in operative connection with the first bolt and a second arm in operative connection with the second bolt;

a connector comprising a first position in which the first arm and the second arm are engaged and a second position in which the linkage mechanism is disengaged;

a drive mechanism to move the connector between the first position and the second position, and an actuator, wherein when the connector is in the first position, operation of the actuator causes unitary movement of the first bolt and the second bolt, and when the connector is in the second position, operation of the actuator causes movement of the second bolt but not the first bolt.

2. The lock of claim 1 wherein the connector comprises one or more pin and/or one or more shaft.

3. The lock of claim 1 wherein the drive mechanism comprises an automated drive mechanism such as, an electrically operated drive mechanism.

4. The lock of claim 3 wherein the drive mechanism comprises a motor.

5. The lock of claim 4 wherein the motor drives movement of the connector between the first and the second position.

6. The lock of claim 4 wherein the motor rotates a gear.

7. The lock of claim 1 wherein the drive mechanism comprises one or more of a solenoid; a sprung pin activated by the solenoid; or a motor driven cam.

8. The lock of claim 1 wherein the drive mechanism is actuated: when a particular event is detected; when a person activates an emergency feature of the building; or by break glass switch.

9. The lock of claim 1 wherein the actuator comprises a lever or handle.

10. The lock of claim 1 wherein the connector is manually operable in addition to being operated by the drive mechanism.

11. The lock of claim 1, further comprising an actuation sensor to detect actuation or turning of the lock.

12. The lock of claim 1 further comprising a monitoring sensor to detect removal of the chassis or actuator.

13. A method of mounting the lock of claim 1, the method comprising:

inserting the first lock in the first recess within the chassis;

inserting the second lock in the second recess within the chassis;

affixing the first lock and the second lock to the chassis; and attaching the chassis to the closure.

14. A closure comprising a lock according to claim 1.

15. The lock of claim 1 wherein the drive mechanism is internally located.

16. The lock of claim 1 wherein the connector further comprises a commissioning control.

17. The lock of claim 1 wherein the first lock comprises a deadbolt lock body and the second lock comprises a mortise lock body.

18. The lock of claim 17 wherein the deadbolt lock body and the mortise lock body are disposed in the chassis at a distance from each other.

19. The lock of claim 1 wherein the drive mechanism is manually activated to move the connector between the first position and the second position.

20. The lock of claim 19 wherein the first lock body has a first keyway for insertion of a first key and the second lock body has a second keyway for insertion of a second key.

21. The lock of claim 1 wherein the first lock body has a first keyway for insertion of a first key and the second lock body has a second keyway for insertion of a second key.

22. The lock of claim 1 wherein a first float plate is sandwiched between the first faceplate of the first lock and the chassis and a second floating plate is sandwiched between the second face plate of the second lock and the chassis.

23. The lock of claim 1 wherein the first faceplate seats into a first chassis aperture and is flush with an external surface of the chassis and the second faceplate seats in a second chassis aperture and is flush with the external surface of the chassis.

* * * * *